United States Patent [19]
Wakamiya et al.

[11] 3,809,459
[45] May 7, 1974

[54] ANTIREFLECTION COATING FOR AN INNER SURFACE OF CEMENTED LENSES

[75] Inventors: Shunichiro Wakamiya, Tokyo; Kiyoshi Itoh, Fukuoka-machi, both of Japan

[73] Assignee: Asahi Kogaku Kogyo Kabushiki Kaisha, Tokyo, Japan

[22] Filed: Oct. 13, 1972

[21] Appl. No.: 297,356

[52] U.S. Cl. ............................................. 350/164
[51] Int. Cl. ............................................. G02b 1/10
[58] Field of Search .................. 350/164, 165, 166

[56] References Cited
UNITED STATES PATENTS
3,533,850   10/1970   Tarneya ............................ 350/164
3,706,485   12/1972   Fawcett ............................ 350/164

Primary Examiner—Archie R. Borchelt
Assistant Examiner—C. E. Church
Attorney, Agent, or Firm—Christie, Parker & Hale

[57] ABSTRACT

An improved arrangement for minimizing reflection of light from the interface between a lens and the adjoining cement has two reflection preventing layers between the lens and the cement. This is of particular value where the difference in index of refraction of the lens and cementing material is greater than about 0.2. The product of the indices of refraction of the two coating layers equals the product of the indices of refraction of the adjacent lens and the cementing material.

4 Claims, 6 Drawing Figures

ANTIREFLECTION COATING FOR AN INNER SURFACE OF CEMENTED LENSES

BACKGROUND

Vacuum evaporation of magnesium fluoride ($MgF_2$) single-layered coating on optical parts such as lenses and prisms has already been well known as a measure for reduction of surface reflection. FIG. 1 gives a group of curves plotting the spectral reflection factor characteristic in such a case utilizing the refractive index of each optical part as a parameter, wherein the abscissa indicates the wave length (m∞) of light and the ordinate indicates the surface reflection factor R( percent). The symbol $n_0$ represents the refractive index of an incident medium (air in this case), $n_1$ represents the refractive index of the $MgF_2$ coating, and $n_g$ the refractive index of optical material such as glass.

FIG. 2 gives a group of curves plotting the reflection factor presented by one of the boundary surfaces defined between balsam and optical material utilizing the respective optical material as the parameter, in the case where optical materials of different refractive indices are cemented one to another with balsam as an optical cementing agent. The reflection factor is calculated, in this case, using balsam with the refractive index of 1.52 as the incident medium. Comparison of corresponding curves in FIGS. 1 and 2 with respect to two optical materials of $1.45 < n_g < 1.80$ clearly indicates that the average reflection factor in FIG. 2 is lower than that in FIG. 1. In case of a lens system such as photographic lens which comprises a plurality of unitary lenses, therefore, it has usually been considered that, the larger number of cementing surfaces, the advantageously higher the transmission factor.

As the working technique of reflection preventing coating has rapidly progressed, however, multi-layered reflection preventing coatings have become easier, permitting the outer surface reflection factor of optical parts to be reduced to an extremely low value. FIG. 3 gives a group of curves plotting this by way of example utilizing the refractive index of each optical material as parameter. From comparison of corresponding curves in FIGS. 3 and 2, it is shown that the average value of the reflection factor of a cementing surface is sometimes higher depending on the refractive index of the particular optical material, namely, in a range of $n_g > 1.65$. It has become important to minimize internal reflection when the difference in indices of refraction of the optical material and the cementing material is greater than about 0.2. Furthermore, there are always provided two boundary surfaces between balsam and optical material in case of cemented lenses and the inner surface reflection due to the internal cementing surfaces is considerably higher than that of external multi-layered reflection preventing coating surface. Although it could be considered even that, in such a case, a lens system free from any cementing surface is rather advantageous, employment of these cementing surfaces often cannot be avoided in view of other requirements such as efficiency with which various kinds of aberration are compensated and facility with which optical systems of complicated configuration such as an erecting prism is fabricated or worked. There must be provided, therefore, an effective reflection preventing measure on inner cementing surface of the lens system.

An object of the present invention is to reduce the inner surface reflection of the inner cementing surface to the maximum extent.

BRIEF SUMMARY OF THE INVENTION

There is therefore provided in practice of this invention according to a presently preferred embodiment, an improved low reflection interface between an optical glass and an optical cementing material wherein the difference between the indices of refraction of the glass and cementing material is greater than about 0.2 comprising a pair of reflection preventing layers between the glass and the cementing material.

DETAILED DESCRIPTION

It is well known that, when light is incident upon single-layered coating on an optical base plate in the direction normal thereto, the reflection is zero at a particular wave length $\lambda_0$ which meets the amplitude requirement $n_1^2 = n_0 n_g$ and the phase requirement $n_1 d_1 = \lambda_0/4$ where $n_g$ is the refractive index of the optical material used, $n_1$ is the refractive index of the coating, $n_0$ is the refractive index of the ambient medium (i.e., incident medium), $d_1$ is the thickness of the coating, and $\lambda_0$ is the observed wavelength.

The indices of refraction are conventionally stated as of the d-line of sodium or about 587.6 m$\mu$.

The ambient medium is air in the general case, and, accordingly, $n_0 = 1$. But according to the present invention, this corresponds to the refractive index of the optical cementing agent used.

Figure 4:
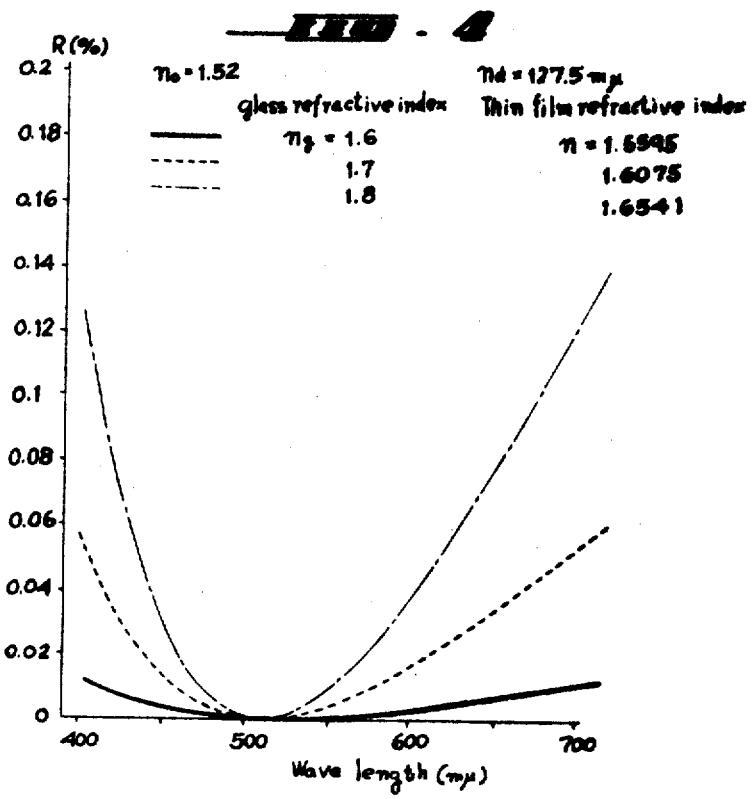
FIG. 4 shows the reflection characteristic of single-layered coating adjacent balsam.

On the assumption that balsam of $n_0 = 1.52$ is used as the optical cementing agent and $\lambda_0$ is 510m$\mu$ near to the center of the visible range, there are a group of curves as given by FIG. 4 which plot the spectral reflection characteristic utilizing the refractive index $n_g$ of each optical material as a parameter. As shown by comparison of the group of curves in FIG. 4 with those in FIG. 2, the reflection preventing effect in FIG. 4 is substantially higher than that in FIG. 2. It should be noted here, however, that FIG. 4 concerns the case where reflection is prevented by single-layered coating and reflection is zero only with respect to a particular wave length. This means that reflection remains in wave length ranges near the ultraviolet and infrared ranges. It is found that a multi-layered coating arrangement is required for elimination or reduction of such a residual reflection.

A reflection preventing coating of Muchmore, Journal of The Optical Society of America, Vol. 38, (1948), pages 20–26 is an extremely effective one which is not only the simplest in construction of all multi-layered reflection preventing coatings but also presents a relatively low reflection factor over a wide wave length range. Requirements for the coating of this type are as follows, on the assumption that the coating is double-layered and the direction of incidence is normal thereto.

Amplitude requirement: $n_1 n_2 = n_0 n_g$

Phase requirement:

$$\cos^2 \delta = (n_1^2 n_g - n_0 n_2^2)/[(n_1 + n_2)(n_1 n_g - n_0 n_2)], \text{ and}$$

$$\delta = \delta_1 = \delta_2$$

where $n_g$ is the refractive index of the optical material used, $n_1$ is the refractive index of the first layer of the coating (the layer adjacent to the ambient medium), $n_2$ is the refractive index of the second layer of the coating (the layer adjacent to the optical material), $n_0$ is the refractive index of the ambient medium, $d_1$ is the thickness of the first layer of the coating (the layer adjacent to the ambient medium), $d_2$ is the thickness of the second layer of the coating (the layer adjacent to the optical material), $\delta_1 = 2\pi n_1 d_1/\lambda$, and $\delta_2 = 2\pi n_2 d_2/\lambda$.

Figure 5:
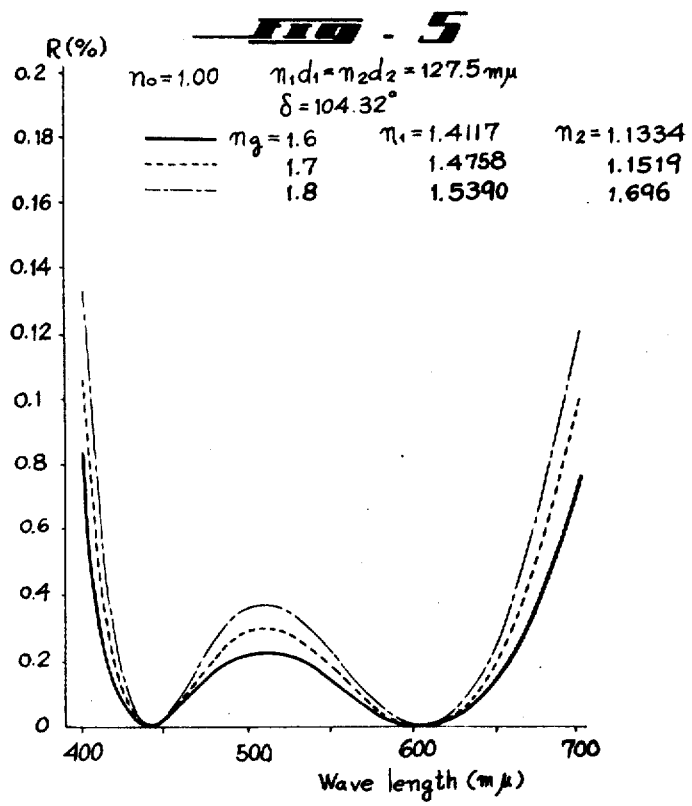
FIG. 5 shows by way of example the characteristic of double-layered reflection preventing coating adjacent air.

The wavelength $\lambda$ used for $\delta$ herein is the $d$-line. Reflection is zero at the points corresponding to the two wave lengths which satisfy the requirements as mentioned just above and it is possible to obtain a wider range of low reflection than in case of single-layered coating. Moreover, $\delta$ involved in the phase requirement may be appropriately selected to vary the interval between these two wave lengths across which reflection is zero and it is easily possible to widen the range of low reflection. FIG. 5 shows by way of example an arangement of the reflection preventing coating which satisfies the requirement with respect to the case where $n_g$ = 1.6 to 1.8 and $n_0$ = 1, that is, at an external surface.

The reflection preventing coating of this arrangement is of an extremely advantageous characteristic, but the refractive index of the coating obtained from the amplitude requirement is too small to be actually realized. Accordingly, no reflection preventing coating of this arrangement has ever been realized.

According to the present invention, the ambient medium is not air ($n_0 = 1$) but the optical cementing agent ($n_0 > 1$), so that there is a possibility of realizing this reflection preventing coating of Muchmore. Assuming that the optical cementing agent, e.g., balsam, has a refractive index $n_0 = 1.52$, there are provided a group of curves plotting the spectral reflection characteristic as given by FIG. 6 wherein the refractive index of each optical material is utilized as the parameter.

Figure 1:
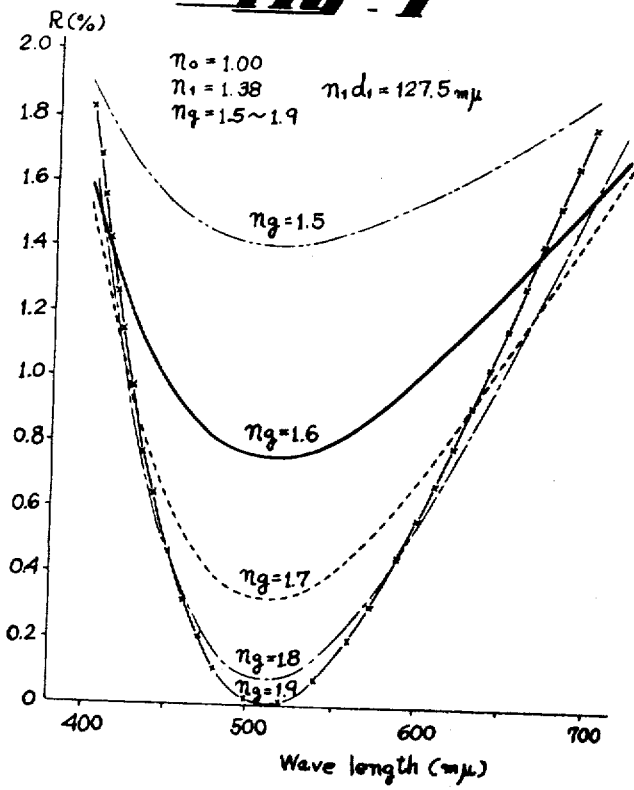
FIG. 1 shows the light reflection characteristic of single-layered coating of magnesium fluoride.
Figure 2:
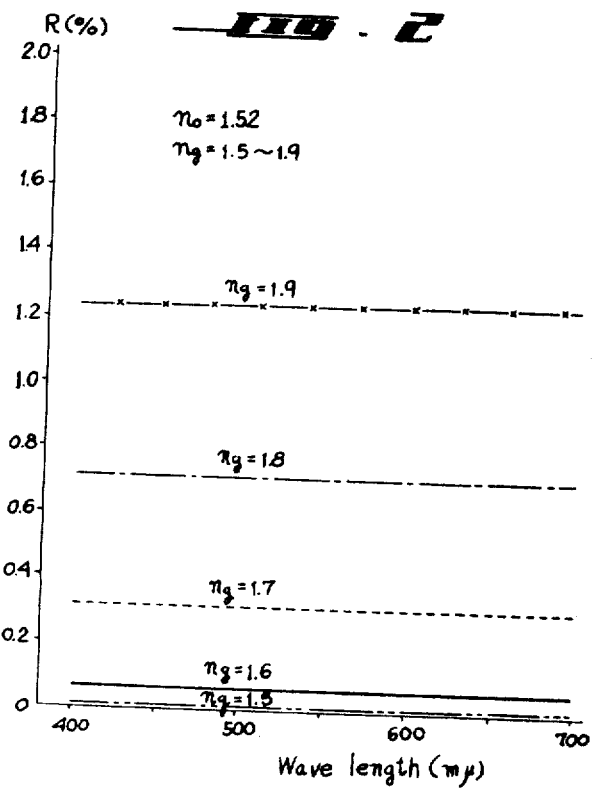
FIG. 2 shows the reflection factor of balsam-glass boundary surface.
Figure 3:
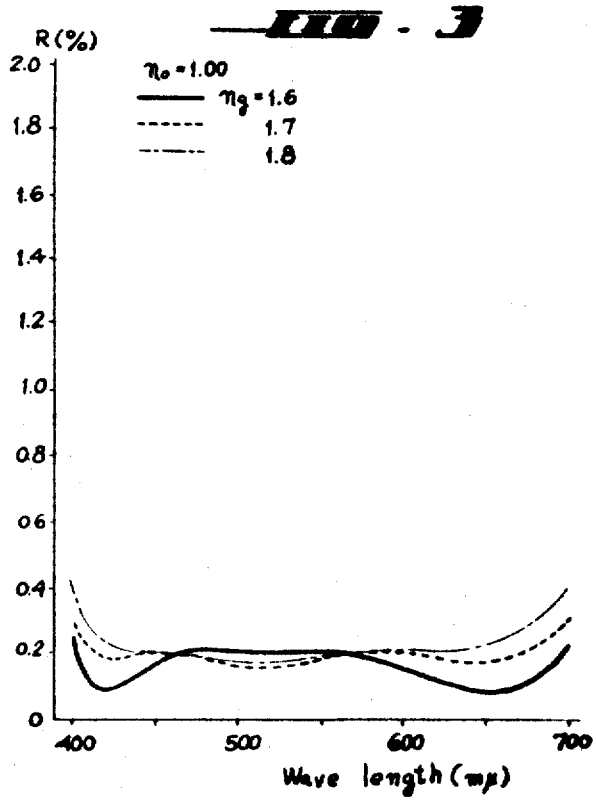
FIG. 3 shows by way of example the reflection characteristic of multi-layered reflection preventing coating.
Figure 6:
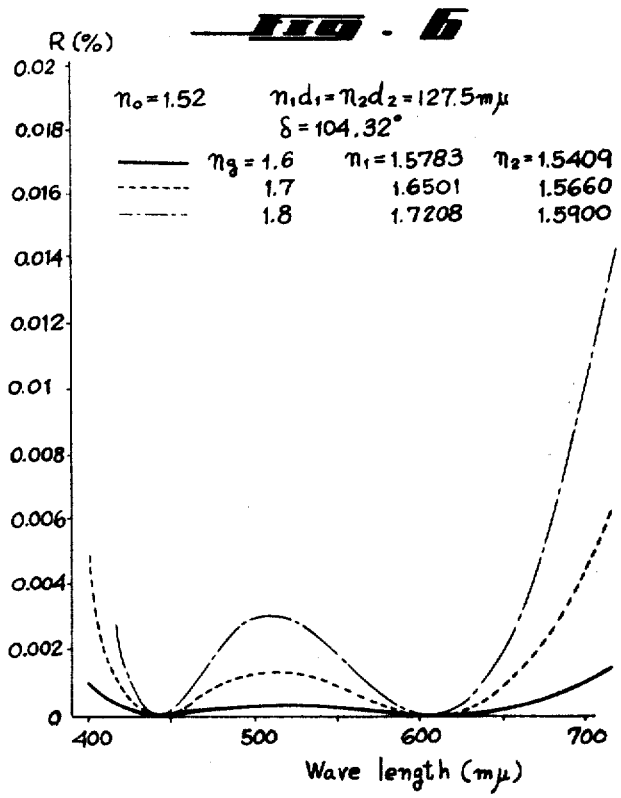
FIG. 6 shows the reflection characteristic of double-layered coating adjacent balsam.

Comparison of these curves in FIG. 6 with a group of curves in FIG. 2 which plot the reflection characteristic of optical material-balsam boundary surface shows that reflection is sufficiently low in FIG. 6 to provide an almost perfect reflection preventing coating, even when the difference in indices of refraction is above about 0.2. Furthermore, the refractive index required here for the coating is one that may be easily realized in the present state of the art.

This reflection preventing coating for an inner cementing surface is advantageous also in color balance compensation of light transmitted by a lens system. Recently glass of various refractive indices has been used as lens material and glass of higher absorption on the side of shorter wave lengths also has been used more and more often. As a result, the lens system comprising a plurality of unitary lenses generally has a problem with respect to the color balance in the visible range and present the spectral transmission characteristic that there is higher absorption on the side of shorter wave lengths. This problem has usually been compensated by an additional coating such as Magenta or amber-coating. Such a measure, however, has increased reflection on each surface with a result that the performance of lens has been lowered.

In case of a single-layered coating (refractive index $n_f$), the intensity of reflected light never exceeds $$[(n_0 - n_g)/(n_0 + n_g)]^2$$

so long as $n_f < n_g$. Accordingly, the less the difference between the refractive index $n_0$ of the incident medium and the refractive index $n_g$ of the base glass, the easier is is to maintain the maximum value of the intensity of reflected light low. This means that it is possible to compensate the color balance of lens system transmission factor without increasing reflection of inner cementing surface by appropriate selection of the central wave length $\lambda_0$ when balsam having a refractive index which is relatively near to that of glass is employed as the incident medium. This is the second advantageous aspect of vacuum evaporation of the coating according to the present invention on the inner cementing surface.

Realization of the reflection preventing coating of such a construction as described hereinbefore requires the coating to have a refractive index that satisfies the respective phase and amplitude requirements. Although there are various methods to obtain the coating of such a desired refractive index including a method in which a mixed coating is obtained by simultaneous vacuum evaporation of several kinds of well known substances at an appropriate ratio, a method of reproducing the refractive index of coating which is the easiest at present is an alternate super-position of two kinds of coating respectively having higher and lower refractive indices. This method can easily realize the characteristic which is equivalent to that of a single coating having the desired refractive index.

As it will be obviously understood from the aforegoing description, the reflection preventing coating of the present invention provides an almost perfect reflection preventing coating for the inner cementing surface of a lens system and enables the color balance to be effectively compensated without an increase of reflection loss.

What is claimed is:

1. An improved low reflection interface between an optical glass and an optical cementing agent wherein the difference between the indices of refraction of the glass and cementing agent is greater than about 0.2 consisting essentially of a pair of reflection preventing layers between the glass and the cementing agent wherein the indices of refraction satisfy the relation $n_1 n_2 = n_0 n_g$ where $n_1$ is the refractive index of a first of the pair of layers, $n_2$ is the refractive index of the second pair of layers, $n_0$ is the refractive index of the cementing agent and $n_g$ is the refractive index of the optical glass.

2. An improved cemented optical element comprising a first transparent optical member having an index of refraction $n_g$, a second transparent optical member, and a cementing material cementing the second optical member to the first optical member, the cementing material having an index of refraction $n_0$ and wherein the differences of indices of refraction $n_g$ and $n_0$ is greater than about 0.2, and improved reflection preventing coating between the first optical member and the second optical member consisting essentially of a first coating layer having an index of refraction $n_1$ and a second coating layer having a different index of refraction $n_2$ wherein the product of the indices of refraction of the two coating layers equals the product of the indices of refraction of the first optical member and the cementing material.

3. A reflection preventing coating for an inner surface of a cemented lens having an optical material with an index of refraction of $n_g$ and a cementing material having an index of refraction of $n_0$ comprising:
a first coating layer having an index of refraction of $n_1$ and a thickness of $d_1$ between the optical material and the cementing material;
a second coating layer having an index of refraction of $n_2$ and a thickness of $d_2$ between the optical material and the cementing material; and wherein said indices of refraction and thicknesses satisfying the relations $n_1\ n_2 = n_0\ n_g$ and $n_1\ d_1 = n_2\ d_2 = \lambda/4$, wherein $\lambda$ is in the visible spectrum.

4. In a cemented lens having at least a pair of lens elements cemented together by an optical cementing material having a sodium $d$-line index of refraction $n_0$ substantially greater than 1.0, one of said lens elements having a sodium $d$-line index of refraction $n_g$ at least 0.2 greater than $n_0$, the improvement consisting essentially of a Muchmore type antireflection coating between the cementing material and the cemented lens having a pair of $\lambda/4$ thick coating layers having sodium $d$-line indices of refraction of $n_1$ and $n_2$, respectively, and wherein $n_1\ n_2 = n_0\ n_g$.

* * * * *